United States Patent
Parkinson

[11] 3,893,214
[45] July 8, 1975

[54] MACHINE FOR MAKING EXPANDED METAL

[75] Inventor: David B. Parkinson, Cleveland Heights, Ohio

[73] Assignee: Gould Inc., Chicago, Ill.

[22] Filed: Aug. 15, 1973

[21] Appl. No.: 388,400

[52] U.S. Cl. .................... 29/6.2; 83/578; 83/695
[51] Int. Cl. ................... B21d 31/02; B26d 1/10
[58] Field of Search .......... 29/6.1, 6.2; 83/215, 558, 83/560, 562, 578, 620, 699, 695

[56] References Cited
UNITED STATES PATENTS

| | | | |
|---|---|---|---|
| 2,751,978 | 6/1956 | Koskinen | 29/6.2 |
| 2,751,984 | 6/1956 | Kuhl | 83/578 X |
| 3,039,344 | 6/1962 | Hercik | 83/699 X |
| 3,268,973 | 8/1966 | Felsenthal | 29/6.2 |
| 3,813,743 | 6/1974 | Harrell et al. | 29/6.2 |

Primary Examiner—Andrew R. Juhasz
Assistant Examiner—Leon Gilden
Attorney, Agent, or Firm—Edward E. Sachs

[57] ABSTRACT

Apparatus for manufacturing expanded sheet stock is disclosed. The apparatus includes a stationary knife having a cutting edge defining one edge of a strip feed slot. While the strip is fed through the slot, a movable knife passes across the slot to form half-diamond-shaped openings in the strip with each stroke. The movable knife has a cutting edge which is defined by a plurality of adjacent obelisk teeth and those teeth form the half-diamond openings during each stroke. The movable cutting knife is driven relative to the stationary knife in planar alignment therewith and in simple harmonic motion while the strip is fed through the slot so that any point on the cutting edge of an obelisk tooth sequentially shears the strip in a recurring sequence to provide half-tooth spacing between successive cuts. Such spacing results in a characteristic diamond-shaped opening in the expanded metal. According to a preferred aspect of this invention, four feed slots are provided and two movable knives have parallel cutting edges which respectively serve adjacent feed slots. The knives are driven in opposite directions to minimize machine vibration, and the knife driving mechanisms are also driven in opposite directions. According to a further aspect of this invention, the strip feed mechanism operates continuously and the strip is intermittently stopped by the shearing action of the movable knife. According to another aspect of this invention, a clamp holds the strip against the stationary cutting knife during the shearing operation.

11 Claims, 13 Drawing Figures

MACHINE FOR MAKING EXPANDED METAL

BACKGROUND OF THE INVENTION

This invention relates to the manufacture of expanded sheet stock and, more particularly, to an improved machine for cutting openings, such as diamond-shaped openings, in sheet stock by shearing portions of said stock in a staggered sequential manner.

Typically, expanded metal sheet or foil is produced by the use of a cutter blade having a serrated or toothlike cutting edge. The blade is rectilinearly reciprocated toward a metal sheet or strip while the strip is clamped against a stationary, straight-anvil type blade. The reciprocation toward the strip is limited so that only a portion of the total depth of the teeth of the reciprocating blade passes through the metal. Following each reciprocation toward and away from the strip, the strip is indexed forward and the blade is rectilinearly reciprocated along its length one-half of a a tooth spacing. Thus, the cut produced by the next reciprocation toward the strip is offset from the previous cut. In this manner, the double reciprocatory movement of the blade produces the well-known, standard expanded metal cut.

To increase the rate of expanded metal production, it has been the practice to increase the length of the blade and/or increase the rate of blade reciprocation. These approaches have not been particularly satisfactory. First, with increases in blade length, it becomes somewhat difficult to assure sufficient blade rigidity to maintain the required close spacing and tolerances (less than 0.10 of the thickness of the metal being cut) between the reciprocating blade and the stationary blade, and to maintain parallelism between the blades. Moreover, increases in blade length ordinarily mean increases in the mass of the blade. This increases the problems involved in dynamically balancing the apparatus. As is conventional with reciprocating-type machines, the higher the speed at which they are operated, the more critical become balancing problems. Furthermore, it is difficult to maintain tolerances in the machine because of the high inertia generated by the blade at the limits of its stroke.

The foregoing problems complicate the maintenance of an extremely precise spacing and a relative relationship between the stationary and reciprocating blades. The criticality of the relative spacing becomes greater as the material thickness decreases and the blade speed increases, since it is necessary to space the blades within one-tenth of the thickness of the material being expanded. To meet this requirement, the prior art has used complicated blade mounting mechanisms which were difficult to adjust and often did not stay in adjustment. These problems of blade adjustment had the further disadvantage of greatly increasing the time required to change blades. Also, the blade assemblies were often difficult to sharpen and total readjustment of the apparatus was required following each sharpening.

The prior art machines also employ a mechanically operated clamp to hold the strip during each cut. This clamp is released after each cut and the strip is advanced so that the next cut may be performed. As can be appreciated, the means used to clamp the strip during each cut must be exactly synchronized with blade movement so that the movable blade does not perform sequential cuts in a single plane, which would thereby sever the strip. The problems of synchronization, again, increase substantially with increases in blade speed because of the short time available for actuation and release of the clamping means.

The prior art machines mechanically index the sheet following each cutting stroke. Increases in the rate of blade reciprocation, therefore, increase the indexing rate of the feed mechanism. The prior art machines, therefore, index forward a slight amount following each reciprocation and then bring the strip to a complete stop during the time the actual cutting operation takes place. Therefore, as the blade reciprocates away from the strip, the strip must be accelerated and advanced the required distance, after which it must again be brought to a precise stop.

In the past, various types of roll feeding means having mechanical indexing arrangements interrelated with the blade drive have been used. Generally, with increased rate of speed, the problems of rapidly indexing the strip forward become almost insurmountable because of the inertia and lost motion inherent in mechanical indexing devices. As a result, it is not possible to stop and start feed rolls with the speed and accuracy required for producing a satisfactory product at the production rate desired. The problem is especially troublesome when it is desired to produce a fine mesh, expanded metal foil.

SUMMARY OF THE INVENTION

This invention overcomes many of the foregoing prior art problems by providing a machine for manufacturing an expanded sheet stock which utilizes a movable blade driving mechanism that produces simple harmonic motion in the movable knife. Such motion ensures a proper deceleration and acceleration at stroke reversals. Furthermore, inertia and balancing problems are minimized while increased output is attained by employing a plurality of relatively small cutting blades mounted in a common plane and each cooperating with a separate stationary blade. A drive apparatus is provided which reciprocates the blades in simple harmonic motion nearly simultaneously and in substantially equal amounts in opposite directions. The blade members are desirably of nearly equal mass. Thus, with equal and opposite motion, their dynamic forces are counter-balanced. Additionally, the blade drive system itself is arranged so that all components are balanced relative to each other.

Preferably, each of the movable cutting blade members has a pair of oppositely disposed cutting edges and is positioned between a pair of stationary blade members. Thus, each of the movable cutting blade members can act to cut a pair of metal strips, i.e., each blade makes a cut at both ends of its stroke. In this manner, each blade expands two strips substantially simultaneously. This, in conjunction with the relatively high rate of reciprocation of which the machine is capable, produces a greatly increased rate of output.

In accordance with one aspect of the invention, the blade arrangement preferably comprises a support member on which are carried a first stationary cutting blade having an elongated cutting edge and base means defining a guide surface lying in a common plane with the cutting edge of the first blade. Mounted on the guide surface for free sliding movement relative thereto is a movable blade comprising a blade body having first and second oppositely disposed, parallel faces, with the first face in engagement with the guide surface. A cutting edge defines at least one peripheral edge of the first face. The movable blade body is maintained in position on the guide surface by a guide or bridge member releasably connected to the base and having a planar surface closely engaging the second surface of the blade body and extending parallel to the guide surface.

Some of the advantages of the above-described cutting blade arrangement are the following:

a. Since an entire cutting blade assembly is preferably carried from a common base member, it can be removed from and replaced on associated machinery in a full-assembled and adjusted condition.
b. Because of the relationship of the guide surface and the stationary cutting edges, sharpening of these edges can be accomplished by placing the entire base on a surface grinder and grinding down the entire guide surface and the top surface of the stationary blades after removal of the movable blade.
c. The movable blade can similarly be resharpened simply by surface grinding the entire first face of the blade and removing an equivalent amount from the guide or bridge member.
d. Because of the above feature, substantially no readjustment of the assembly is required following sharpening.

According to this invention, the drive assembly for the movable blades includes a common drive shaft extending substantially midway between two cutting blades and carrying eccentrics which are drivingly connected to the ends of the blades through connecting rod arms. The one-half tooth spacing longitudinal movement of the blades is preferably provided by a second set of eccentrics which are driven from the main shaft in timed relationship to the first eccentrics and have connecting rod arms connected to the ends of the blade for longitudinal movement relative thereto. As will hereinafter become apparent, precise one-half tooth spacing between cuts is attained by closely controlling the phase angle between the eccentrics.

It has been found that for relatively thin material it is not necessary to positively clamp the material during each cutting operation. In such circumstances, the relatively thin strip is fed between guide surfaces, one of which is spring-biased on the strip which passes therebetween. The mass of that guide surface is sufficient to hold the relatively thin strip. Since the movable cutting blade edge operates in substantially the same plane as the stationary cutting blade edge, the cut is made without any noticeable strip bending. For relatively thick material, the invention provides an improved work clamp and clamp-actuating arrangement which is interrelated with the movement of the movable blade body. In particular, a clamp member is mounted adjacent the first stationary cutting blade and extends generally parallel to its cutting edge. Preferably, the clamp member is carried by the base means and maintained under a predetermined bias toward the first stationary blade to continually apply a slight gripping force to the strip passing through the machine. Fluid power means are mounted in the base means and serve to apply substantial pressure to the clamp bar in timed relationship with movement of the movable blade. Fluid is supplied to the power means by passages formed through the movable cutting blade and the base means and having orifices in the first surface of the blade body and the drive surface. Thus, control of fluid through the passages is effected by movement of the movable blade over the guide surface, causing the orifices to go into and out of alignment.

By use of the described arrangement, very simple and reliable clamp control results. Additionally, the arrangement does not adversely affect the other advantages listed above. Furthermore, it offers the added advantage of reducing wear between the movable blade and the guide surface because of the presence of a film of actuating fluid between the sliding parts.

The invention also provides a constantly driven feed roll arrangement which eliminates the need for stopping and starting the feed rolls with each reciprocation of the blade. In particular, according to the invention, the feed system comprises a pair of cooperating feed rolls which define a roll bight through which the strip is fed. The bight of the rolls is located relative to the opening defined by the stationary cutting blade and the clamp mechanism so that there is a slight bow or arc in the portion of the strip between the bight and the opening. The reciprocating cutting blade is associated with the fixed cutting blade and arranged to cut the strip while it is clamped by the clamp mechanism or while it is retained by the mass of the previously described guide slot. Specifically, at least one of the rolls of the pair of rolls is provided with a resilient outer surface so that when the strip is clamped between the stationary blade and the clamp, or when the strip is stopped by the cutting action of the movable blade, the roll surface will give to permit continued constant rotation of the main body of the rolls while the portion of the surface in contact with the strip is stopped. Furthermore, some inherent backlash is in the rolls to partially accommodate strip stoppage. Thereafter, when the clamp is released, or when the movable blade disengages, the recovery of the resiliently deformed portion of the feed roll surface, plus the bow in the strip, imparts a sudden acceleration to the lead end of the strip while the body of the roll continues its constant rotation.

The means for rotating the feed rolls preferably comprises a variable speed motor which can be closely adjusted so that the rate of roll rotation corresponds over an incremental period of time with the rate of strip movement through the cutters. However, the means could be driven directly from the cutter drive at a fixed speed relationship and gears changed to vary spacing between successive cuts.

By the use of the described feed arrangement, the problems of stopping and starting the feed rolls are totally eliminated. The cutters can be operated at substantially as high a rate as possible and a continuous strip feed carried out.

DETAILED DESCRIPTION OF THE INVENTION

The apparatus in general

Referring more particularly to the drawings, FIGS. 1, 2, 4, and 5 best illustrate the overall arrangement of a cutting and expanding apparatus 10. The apparatus 10 is shown as comprising a relatively rigid main frame 12 formed from a pair of vertically extending plates 14 and 16 which are suitably connected to a heavy base plate member 18. A pair of upper and lower blade, blade guide, and clamp assemblies 20, 22 is carried by the vertically extending plate 14. As will be explained, the assemblies 20 and 22 are arranged to simultaneously make the cuts necessary to expand four metal strips 23–26 which are fed through the plate 14 to the blade assemblies by strip feed assemblies 30, 30a, 31 and 31a (see FIGS. 2, 4, and 5). It should be understood, of course, that the strip is supplied to the apparatus from suitable coil-holding apparatus or the like (not shown).

The upper and lower assemblies 20 and 22 are given the required reciprocation toward and away from the strips by a main drive assembly that includes first drive means 34 which acts to drive upper and lower movable cutting knives or blades 20a and 22a in directions generally perpendicular to their oppositely disposed pairs of toothed or serrated cutting edges 20b and 22b and toward cooperating stationary knives or blades 20c and 22c. The main drive means further includes second drive means 36 which act to impart a reciprocation in times relationship with the first drive means 34 to move the blades in a direction generally along their cutting edges. That is, longitudinal reciprocation sufficient to provide a required half-tooth spacing between successive cuts is provided by the second drive means 36.

Each of the major assemblies constituting the apparatus will now be described in somewhat greater detail.

Upper and lower blade and blade guide assemblies

Each of the blade and blade guide assemblies 20 and 22 is of generally similar construction. Accordingly, only the assembly 20 will be described in detail, and the desription thereof is to be taken as equally applicable to the assembly 22 unless otherwise noted. Moreover, like parts are identified by the same reference numerals but differentiated by the addition of a prime (') suffix.

Referring in particular to FIGS. 1, 2, 3, and 7, the upper blade and blade guide assembly 20 includes a base member 38 which is releasably connected to the vertically extending frame plate 14 in any convenient manner, such as by a plurality of socket head machine screws 40. Fixed to the base 38 by screws 58 (FIG. 7) is a strip clamp and blade guide assembly 42 which includes the pair of vertically spaced, stationary cutting blades 20c and a pair of horizontally extending clamp bars 48 and 50 (see FIGS. 2 and 3) which are carried in a base 51 and cooperate respectively with the upper and lower stationary cutting blades 20c. The clamp bars 48 and 50 are controlled to be actuated outwardly in timed relationship with the movable blade 20a so as to clamp the respective strip during the time it is engaged by the movable cutting blade 20a. The means used for actuating the clamp bars 48 and 50 could be of many types; however, in the illustrated embodiment, they are air-actuated, and the flow of air to the clamp bars is controlled by the movement of the movable blades, as will hereinafter become apparent.

The stationary upper and lower cutting blades 20c each respectively comprise a blade body 45 and 47 having straight, horizontally extending cutting edges 57 and 59, respectively. Preferably, the cutting edges 57 and 59 are defined by carbide inserts brazed into the bodies 45 and 47. Each of the blade bodies 45 and 47 is independently and releasably connected to the base 38 by the machine screws 58 (see FIGS. 1 and 7). The stationary cutting blades are mounted for fine adjustment relative to the cooperating clamp bar. For this reason, plates 62 and 62a are connected to extend outwardly from the upper and lower edges of base 38 by screws 61. Alternate arrangements are illustrated to perform the adjustment. The blade body 47 is illustrated as being capable of adjustment by adjusting screws 60 which extend upwardly from the plate 62a and which are threadedly received in the blade body 47. Between the plate 62 and the blade body 47 are shims 62b. To change the shims, the mounting screws 58 and the screws 60 are loosened. Thus, fine positioning of the blade is possible, since there is a slight clearance between the screws 58 and the blade body 47 provided by vertical slots (not shown) in the blade body. The blade body 45 is illustrated as being capable of adjustment by a jackscrew 60a which is threaded through the plate 62 and bears against the body 45. A screw 61a fixes the blade body 45 to the plate 62 and is provided with a spacer washer 61b. A relatively heavy leaf spring 65 is held against the face of the body 45 by the screws 58 and resiliently biases the body 45 in an adjusted position. The adjustment may be changed by loosening the screws 58 and turning the jackscrew 60a, since there is a slight clearance between the screws 58 and the blade body 45 provided by vertical slots (not shown) in the blade body.

Figure 8:
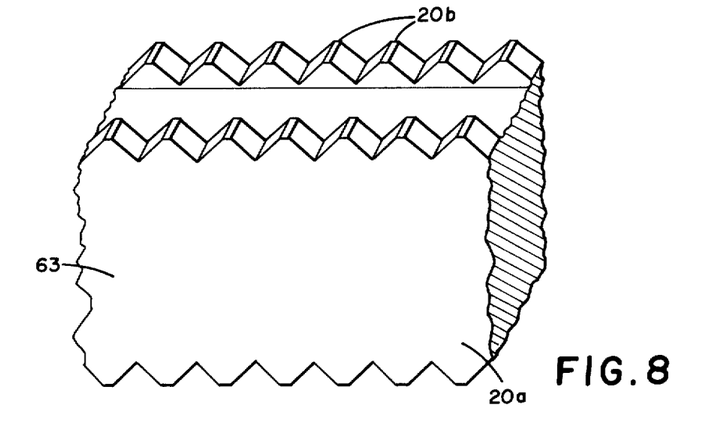
FIG. 8 is a perspective view of a movable blade showing the cutting teeth in detail.

As previously mentioned, between the pair of stationary cutting blades 20c is positioned the movable blade member 20a. The blade member 20a is mounted for free sliding movement on the left-hand surface of guide member 42 (as viewed in FIGS. 2 and 3). As shown, the blade member 20a comprises a main body 63 having its upper and lower cutting edges 20b carried along its laterally opposite sides. The cutting edges 20b are preferably formed by carbide members brazed to the main body 63. Each cutting edge 20b has a tooth-like or obelisk configuration, as shown in FIG. 8. The teeth continue across the face to provide a second set of cutting edges on the opposite face of the body. This second set performs no cutting function when the apparatus is assembled as illustrated. However, when set 20b is dull, the blade can be reversed to bring the second set into cutting position. Such blade reversal, however, renders a fluid power strip clamping arrangement inoperative. As will be explained, the power clamp feature is not needed in many instances.

Figure 1:
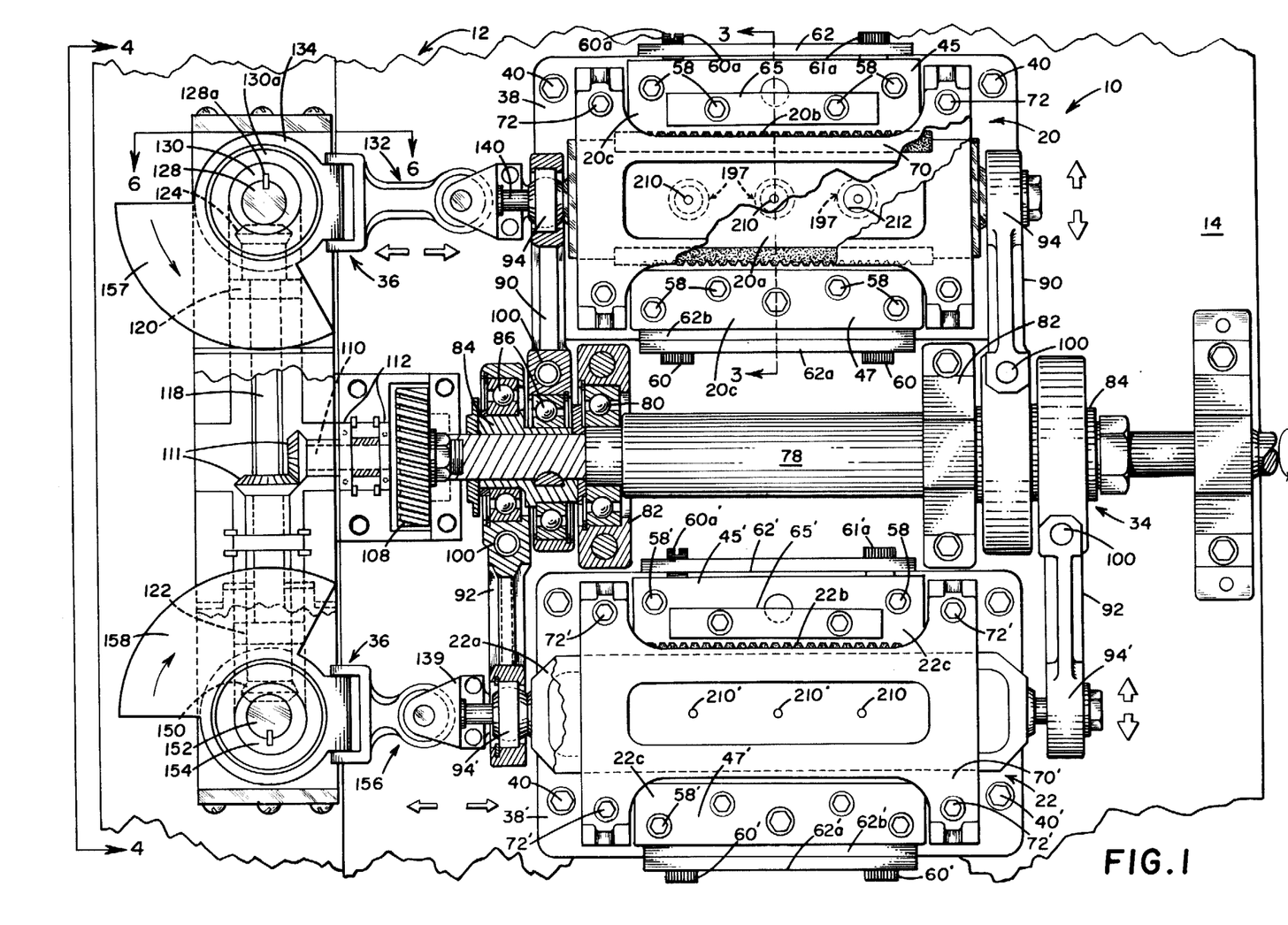
FIG. 1 is an elevational view, partly in section, and with portions broken away to show certain structural details, looking toward the blades of an apparatus employing various aspects of the invention (the material being worked on is coming toward the viewer)
Figure 3:
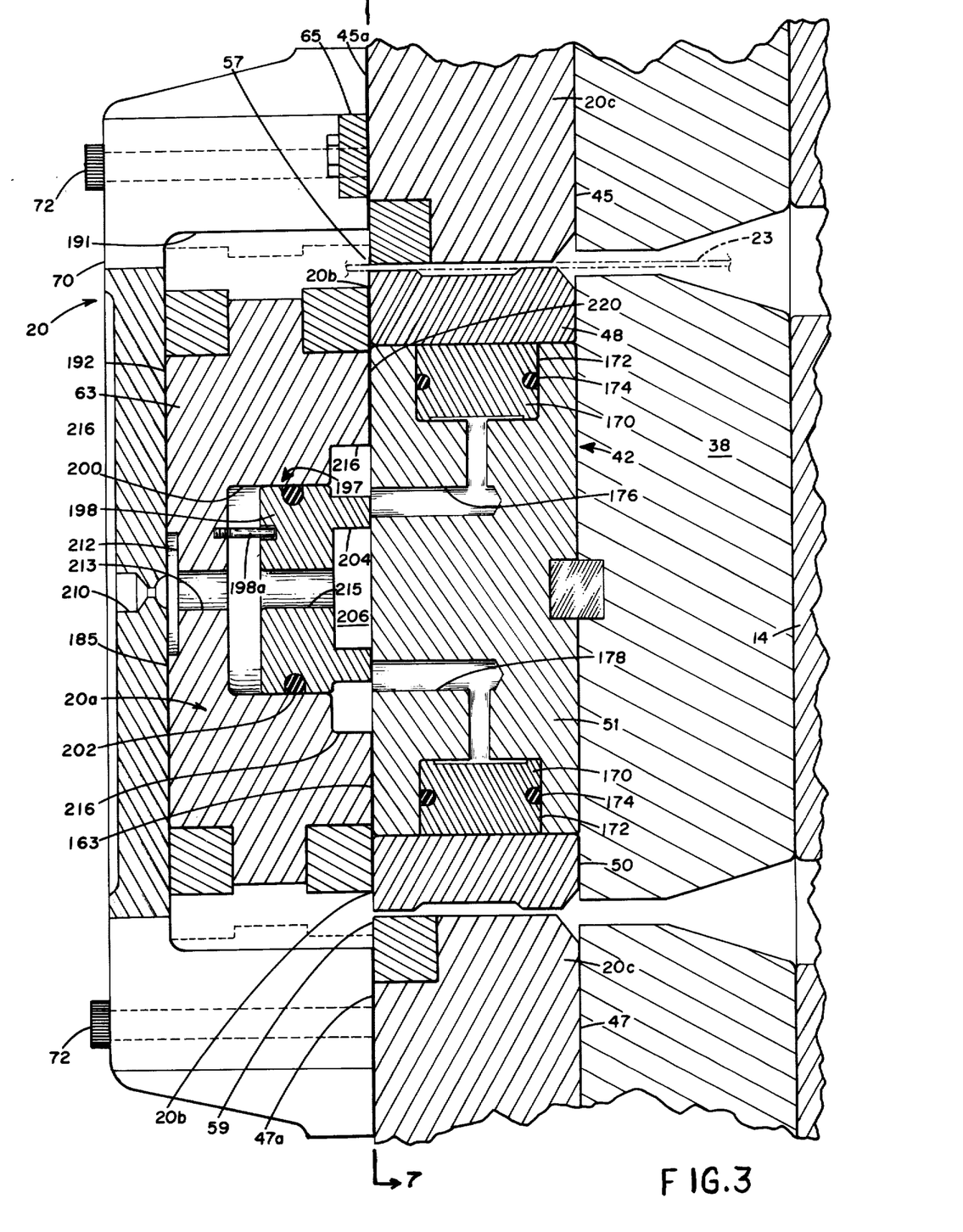
FIG. 3 is a cross sectional view, the plane of the section being indicated by the line 3—3 in FIG. 1.

The blade member 20a is maintained in position on the guide member 42 by a bridge or second guide member 70 having the shape best seen in FIGS. 1 and 3. The bridge member 70 is releasably connected to base 38 in any convenient manner such as through the use of socket head machine screws 72. As can be seen, member 70 provides close guiding for the movable blade member 20a while permitting it to be reciprocated both along its edges and in directions perpendicular thereto without adding mass to the moving system.

Blade drive assembly

As discussed earlier, the movable blade member 20a and the movable blade member 22a of the upper and lower blade assemblies 20, 22 are given simultaneous reciprocation in directions generally perpendicular to their cutting edges and are moved in essentially simple harmonic motion. The drive system is arranged so that the reciprocations of each blade take place simultaneously substantially an equal amount in opposite directions. Because the blades have substantially equal mass, this arrangement permits the apparatus to operate at an extremely high rate of speed with the blades mass-balancing one another.

The means for driving the blades includes a main, horizontally extending drive shaft 78 which is suitably supported midway between the blade assemblies in bearings 80 carried in bearing blocks 82. The bearing blocks 82 are releasably connected to the vertically extending support or frame plate 14. The shaft 78 is driven by a motor 81 (see FIG. 5) mounted beneath the machine and connected to the right-hand end of the shaft 78 (as viewed in FIG. 1) through a pulley 83.

Each of the upper and lower movable blades is drivingly connected at its opposite end to the drive shaft 78 by the first drive means 34. The drive means 34 comprise eccentrics 84 which are keyed to the drive shaft 78. Each eccentric 84 imparts a drive movement to each blade and, in effect, comprises two eccentrics 180° out of phase. Suitable bearings, such as the bearings 86 or hydrodynamic bearings, are carried on the eccentrics and receive the larger end of connecting rod arms 90 and 92, respectively. The first pair of connecting rod arms 90 are connected to the outer ends of the upper blade by self-aligning bearings 94 which permit the connecting rod to oscillate slightly relative to the blade. The connecting rod arms themselves are made in two parts pivotally interconnected at 100 to provide the degree of freedom necessary to permit movement of the blades in directions along their cutting edges as well as the directional movement perpendicular thereto imparted by eccentrics 84.

The means for imparting the movement to the blades in back and forth directions along their cutting edge comprises the second drive means 36 driven from shaft 78 in timed relationship relative to the movement of the eccentrics 84. The lefthand end of the shaft 78 (as viewed in FIG. 1) includes a pinion gear (not shown) which engages a larger gear 108 so that the gear 108 rotates at half the speed of shaft 78. The remaining portion of the drive means 36 are all 1:1 gear ratios so that the relationship between the full cycle movement imparted to the movable blades by the drive means 32 and the full cycle movement imparted to the movable blades by the drive means 34 is 2:1. It should be understood, of course, that other relationships between the pinion gear and gear 108 could equally well be utilized provided that the relative movements obtain.

In the illustrated embodiment, the gear 108 is carried at the end of a shaft 110 mounted in bearings 112 carried by the frame member 14. The left-hand end of the shaft 110 is connected through right-angled miter gears 111 to a vertically extending shaft 118. The shaft 118 is mounted at its opposite ends in bearings 120 and 122. Carried at the upper end of shaft 118 is a miter gear 124 which drivingly engages a second miter gear 126 (see FIG. 6). The gear 126 is drivingly connected to a shaft 128 carried in suitable bearings 129. An eccentric 130 is positively connected by a key 128a to a projecting end of the shaft 128. Rotation of eccentric 130 is transmitted in the form of back and forth movement to the upper blade 20a by a connecting rod assembly 132. The connecting rod assembly 132 includes a first end portion 134 which rotatably receives the eccentric 130 by a bearing 130a, and a second portion 136 hinged to the portion 134 by a pin 137. The other end of the portion 136 is pivotally connected to a clevis 139 which receives and is fixed to a reduced diameter end portion 140 of the upper movable blade 20a.

During rotation of the shaft 78, the eccentrics 84 impart movement to the upper and lower blade members in directions generally perpendicular to their cutting edges. Simultaneously, the eccentric 130 imparts a movement to the upper blade in directions along its cutting edge. As will be explained in greater detail, the eccentricity of the eccentric 130 is such that the blade is moved back and forth through a total distance slightly exceeding (or in one instance, corresponding to) its edge one-half tooth spacing so that precise one-half tooth spacing is attained between cuts. This produces the distinctive standard metal cut shown in FIG. 10. It has been found that the phase angle relationship between the eccentrics 84 and the eccentric 130 is important. This will subsequently be discussed in some detail.

The lower blade is similarly driven from the shaft 78 to move it in directions along its cutting edge. The drive connection includes a bevel gear 150 which is connected to the lower end of the vertically extending shaft 118 and engages a second bevel gear carried at the lower end of a horizontally extending shaft 152. The shaft 152 is carried in suitable bearings in the manner of the previously mentioned shaft 128. The outer end of the shaft 152 has an eccentric 154 which may be identical to the eccentric 130 (if the knives have identical tooth patterns) and is connected to the end of the lower blade by a connecting rod assembly 156 which is constructed generally in the same manner as the previously discussed connecting rod assembly 132. The blades 20a and 22a are moved in the same direction by the eccentrics 130 and 154 and are mass-balanced by counterweights 157 and 158 carried on the shafts 128 and 152, respectively. Counterweights 157, 158 rotate in opposite directions so that they act to counterbalance one another in the vertical direction while counterbalancing the blade members in the horizontal direction.

Strip clamp assembly

Figure 7:
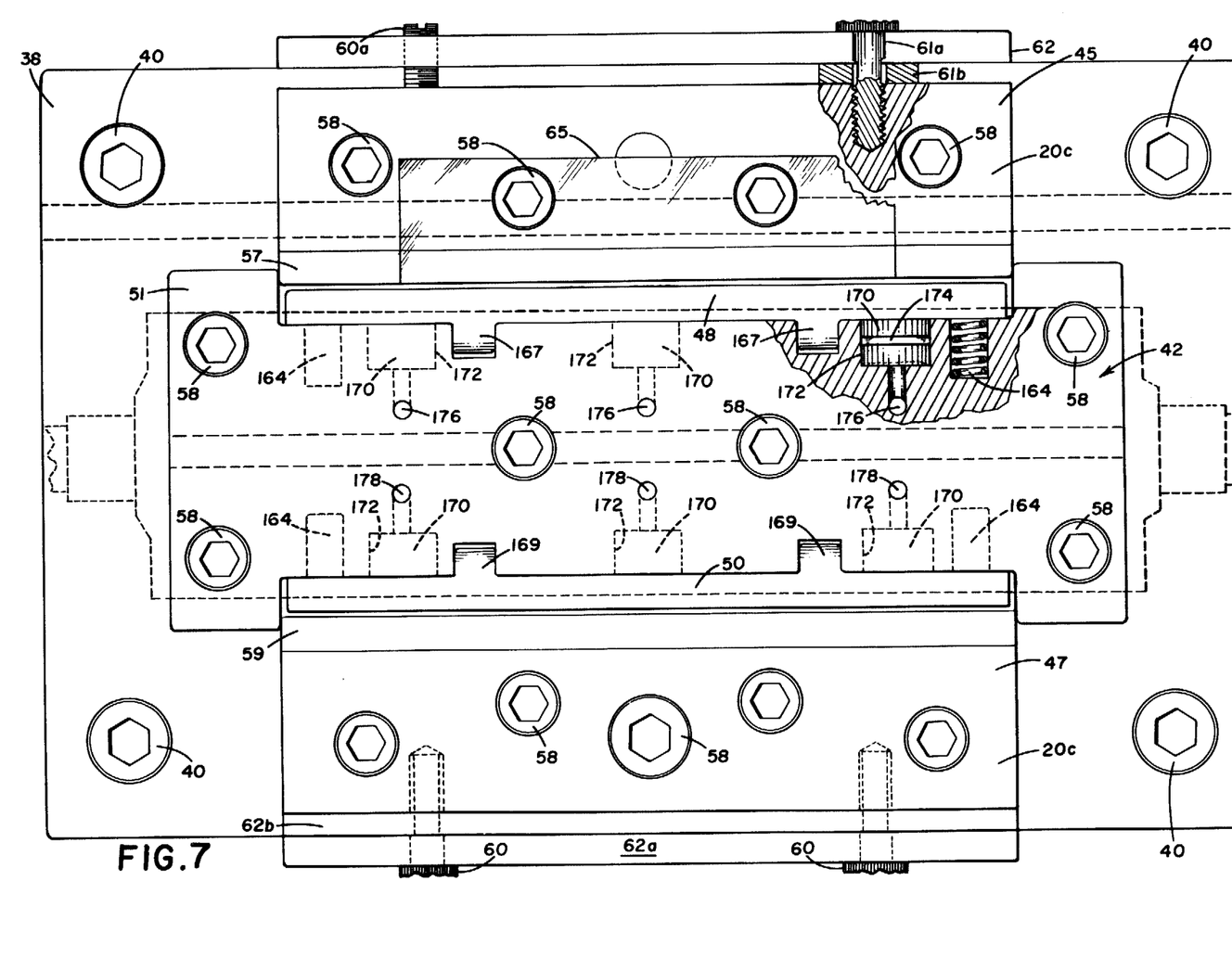
FIG. 7 is a cross sectional view, the plane of the section being indicated by the line 7—7 in FIG. 3.

Referring now to FIGS. 3 and 7, the strip clamp assembly includes the previously mentioned clamp bars 48 and 50 carried along laterally opposite sides of the base 51. The clamp bar 48 is located and arranged to cooperate with the stationary blade 57 to clamp the strip 23 thereto at predetermined times during the operation of the apparatus. Similarly, the clamp bar 50 is arranged to cooperate with the stationary blade 59 for clamping the strip 24. As best seen in FIG. 7, each of the clamp bars 48 and 50 is guided relative to the base 51 by respective tab portions 167 and 169 which extend from the clamp bars into corresponding grooves or recesses formed in the base 51. The clamp bars are maintained under a continual outward bias by suitable compression springs 164 which are positioned between the clamp bars and base 51. The clamp bars thus maintain a continuous, controlled guide and clamping pressure on the strip passing through the associated opening.

When operating with very thin strip and at close cut spacings, the mass of the clamp bar alone is sufficient. In these instances, the clamp bars are merely maintained under the spring pressure to constantly grip the strip with a slight force. This arrangement is satisfactory when the apparatus is used for expanding relatively thin material (e.g., 0.006 inch or less at comparatively high rates of speed). However, during other operations, the strip must be clamped more tightly in preparation for a cut. For this purpose, means are provided to apply a timed force to the clamp bars substantially greater than the original spring pressure. In the disclosed embodiment, these means comprise fluid power means in the form of fluid pistons 170 carried in cylinders 172 formed along opposite sides of the base 51. Three of the pistons 170 are illustrated as being positioned along each side of base 51 and respectively engaging the clamp bars 48 and 50. The pistons 170 are mounted for reciprocation in the cylinders 172 and are provided with suitable seals 174. As can be appreciated, actuation of the clamp bars 48 and 50 is provided by supplying pressurized fluid behind the pistons 170 through fluid passages 176 and 178, which communicate with a surface 163 of the base 51 and with the cylinders 172. The passage 176 supplies pressurized fluid to the piston 170 to actuate the clamp bar 48 and the passage 178 supplies the fluid to the piston 170 to actuate the clamp bar 50. Control of the pressurized fluid to passages 176 and 178 will subsequently be described.

As mentioned, blade member 20a is arranged for free sliding movement over the guide surface provided by the face 163 of the base 51. It is held in a guided position thereon by the bridge member 70. As noted, the opposite faces of the blade member 20a are generally parallel and one face 185 extends into a recess 191 in the bridge member 70 and into sliding engagement with a planar surface 192 of the recess. The depth of the recess in the bridge member is such that the distance between the surface 192 and the face 163 is only a very slight amount greater than the thickness of the blade member 20a. Thus, the blade member 20a is slidably guided between the surface 192 of the recess 191 and the face 163 of the base 51.

The bridge member has substantial beam strength. Because the blade is held between the bridge member and the face 163, the blade itself can be relatively lightweight and is not required to have great strength in the lateral direction. This allows reduction in the weight of the blade to allow the machine to operate at greater rates of speed than with the conventional prior art machines.

The means for controlling the fluid supplied to the cylinders 170 to produce actuation of the clamp bars 48 and 50 in timed relationship with the reciprocation of the blade 20a comprise three valve assemblies 197 including piston-like members 198 mounted in cylinders 200 formed within the blade body 63 (see FIGS. 1 and 3). The valve assemblies are preferably as close to the pistons 170 as possible. By mounting them in the position shown, only a very short length of air supply passage must be pressurized and exhausted during actuation of the piston 170. This is important when it is considered that the subject blade assembly is intended to operate in the range of from 5,000 to 10,000 cycles per minute. It is also preferred that each of the cylinders 170 includes its own separate, closely associated valve for the same reason. The piston-like members 198 are provided with seal rings 202 and further include a rib 204 which extends to the right, as viewed in FIG. 3, and forms a rectangular chamber 206. The end of the rib 204 is planar and engages the surface 163 of the base 51. During reciprocation of the blade member 20a, the rib 204 serves as a valve element to alternately connect the ends of the passages 176 and 178 with the chamber 206. To prevent rotation of each member 198, guide pins 198a are provided.

Air pressure is supplied to the cylinder 200 from an external source connected to inlet openings 210 formed in the bridge member. Three recesses 212 are formed in the blade body and connected with the cylinders 200 through passages 213. It should be noted that recesses 212 are of a size such that they are always in full communication with the opening 210 throughout all positions of blade movement. An opening 215 extends through the piston 198 so that, as the chamber 206 passes over passages 176 and 178, fluid pressure is supplied to the pistons 170 and the corresponding clamp bar is actuated to more securely grip the associated strip against the stationary cutting blade during the time that the movable blade is performing a cutting operation on the strip.

It should be noted that the diameter of the cylinders 200 is preferably slightly greater than the diameter of the chambers 206 defined by the ribs 204. This assures that a continual slight pressure bias is maintained on the piston members 198 to maintain the annular rib in contact with the surface 163.

Exhausting of the fluid from the cylinders 172 is also accomplished by the same valving arrangement. As shown, each cylinder 200 intersects a groove or recess 216 which extends the length of the blade body. The ends of recess 216 are in open communication with atmosphere. Thus, when the blade body 63 is reciprocated to its uppermost position (as viewed in FIG. 3), the lower passage 178 is connected with the recess 216, exhausting it to atmosphere and relieving the force from the clamp bar 50 to allow the strip 24 to again pass through the opening in preparation for the successive cut. Upon a reverse movement of the blade, the passage 176 is connected with the chamber 216 and it is likewise exhausted, reducing the clamping force of clamp bar 48.

Because of the manner in which air is supplied to the clamp bars, air leakage on opposite sides of the blade body 63 is believed to provide a slight air cushion on which the blade body is supported; that is, a slight air film is believed to be present on both sides of the blade body so that wear between the blade body and the guide surfaces is held to a minimum.

As is apparent from the foregoing, the movable blade and stationary blade members can be removed and replaced from the associated machine as a unit. After disconnecting the blade drive mechanism, the entire cutting assembly can be disconnected by removing the screws 40. In this manner, a resharpened and properly adjusted cutting assembly can be installed in a minimum of machine downtime.

To sharpen the assembly, the bridge member 70 and the movable blade are removed. This exposes stationary blade surfaces 45a and 47a of the blade bodies 45 and 47 and the guide surface 163 of the base 51. This entire assembly can then be placed on a surface grinder and the surfaces 45a, 47a, and 163 ground down slightly, thereby sharpening the stationary cutting edges 57 and 59. The cutting edges of the movable blade can likewise be sharpened merely by surface grinding an entire face 220 of the movable blade. A similar grinding operation is performed on the bridge member to remove an equivalent amount of material, which assures that the spacing between faces 192 and 220 remain equal to the thickness of the movable blade. The apparatus can thereafter be assembled for replacement on the same or another machine.

Feed assembly and cutting motions

Figure 2:
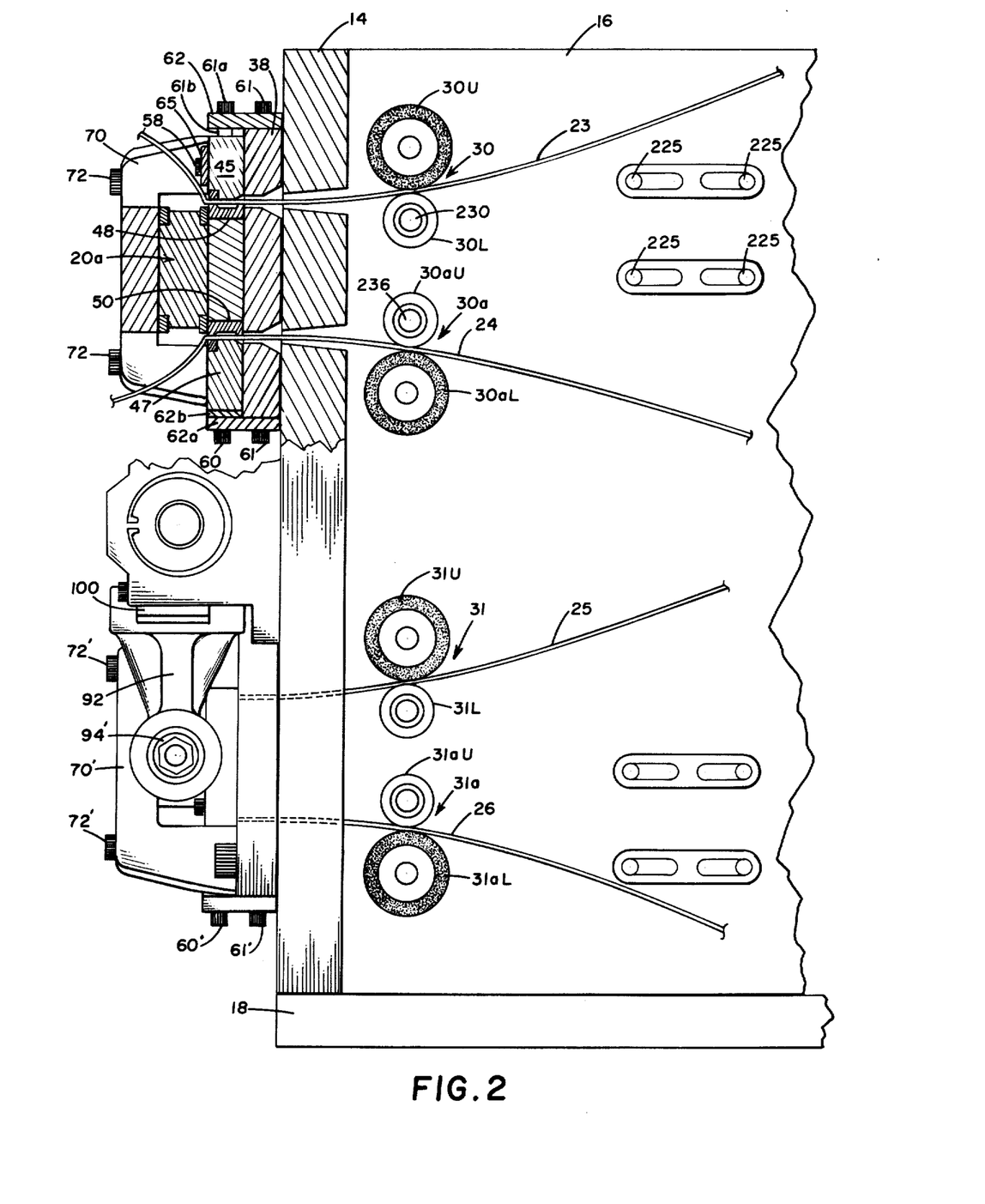
FIG. 2 is a side elevational view, partly in section, with certain portions omitted and broken away for clarity and to show the roll feed mechanism.
Figure 4:
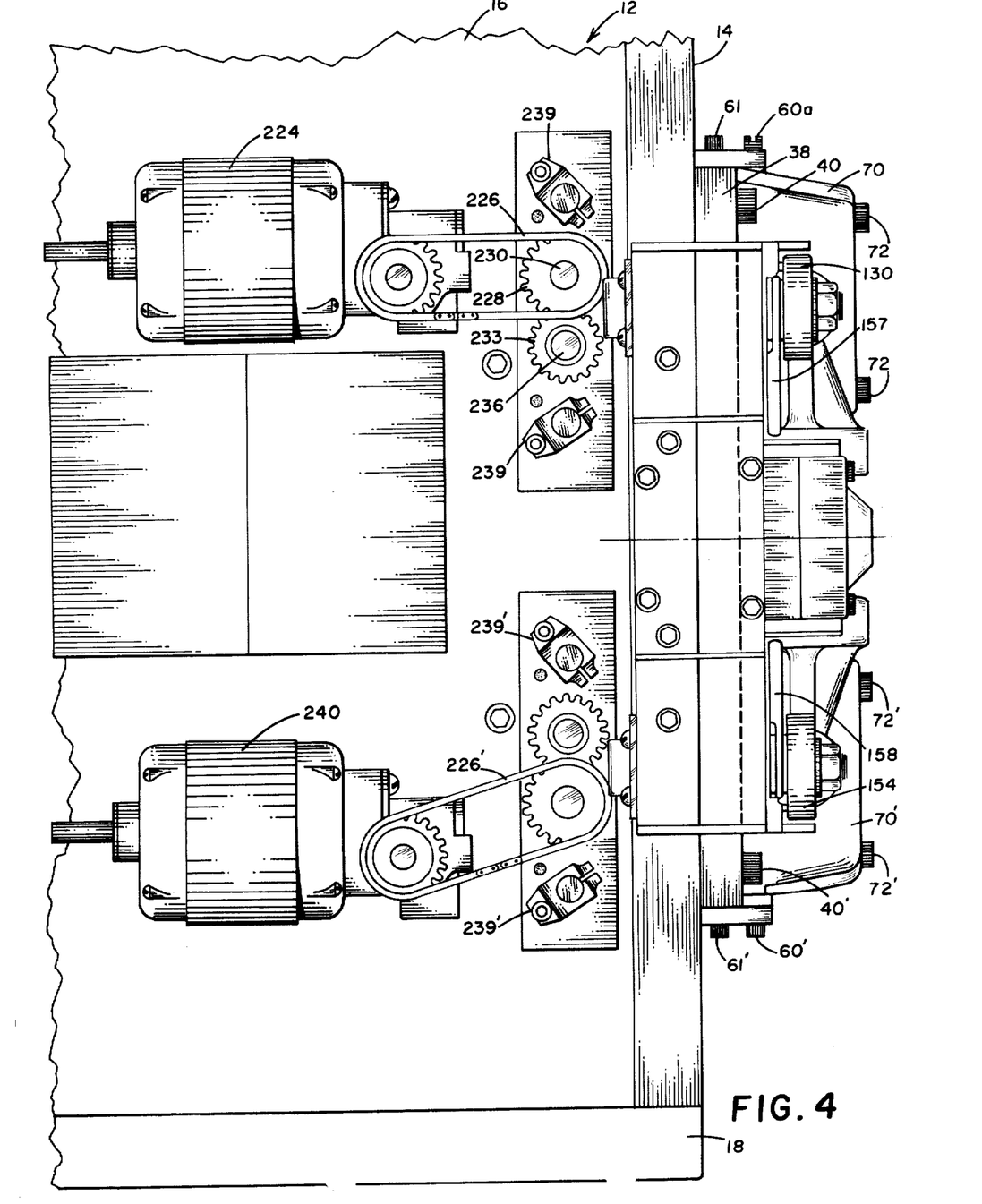
FIG. 4 is a side view of the apparatus, the plane of the view being indicated by the line 4—4 in FIG. 1.
Figures 5, 6:
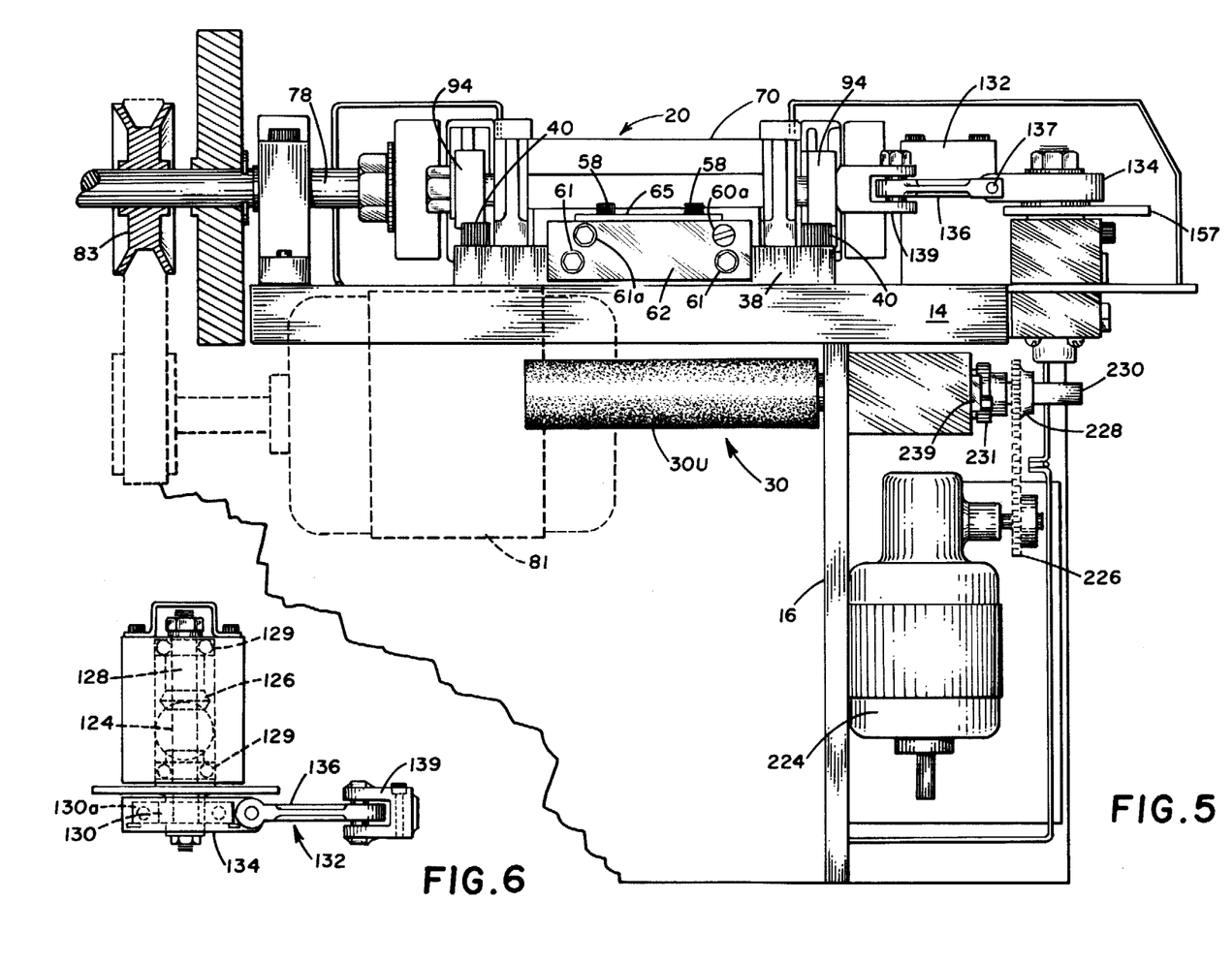
FIG. 5 is a plan view of the apparatus shown in FIG. 1.
FIG. 6 is a cross sectional view, the plane of the section being indicated by the line 6—6 in FIG. 1.

As best shown in FIGS. 2, 4, and 5, the means for feeding the strip to the upper and lower cutting assemblies comprise four feed roll sets 30, 30a, 31, and 31a. The two upper sets 30 and 30a are driven by a variable speed motor 224 fixed to the plate 16 by bolts 225 and connected by a chain 226 to the upper feed rolls through a sprocket 228 carried on a shaft 230. The shaft 230 carries a roller 30L and is engaged with a shaft 236 of a roller 30aU through cooperating gears 231 and 233, as shown in FIGS. 4 and 5. Consequently, the smaller diameter rolls of each of the roll sets 30 and 30a are simultaneously driven by the variable speed motor 224. The larger diameter rolls 30U and 30aL of the sets 30 and 30a act to pinch the strip against the driven roll of each set. Additionally, the larger diameter rolls 30U and 30aL are carried on shafts which are mounted in eccentric mountings (not shown) so that they can be shifted away from the cooperating driven roll when desired by pivoting an eccentric operating lever 239. The roll sets 31 and 31a are similarly driven from a variable speed motor 240. A detailed description of the drive connections between motor 240 and the roll sets 31 and 31a appears unnecessary.

The feed rolls maintain strip drive while the lead end of the strip is stopped by the movable knives because of two separate relationships present in the apparatus. First, as may be seen in FIG. 9, a slight bow in the lead end portion of the strip between the clamp and the roll bight provides some compliance and serves to take up a portion of the strip feed movement while the lead end is stopped. Secondly, the outer surface of the rolls is formed from a resilient material such as rubber or other suitable polymeric material. The resilient surface of the roll thus provides additional compliance or takeup of the strip. Although the preferred embodiment includes a resilient outer surface on each of the rolls, such resilient surface is not necessarily required on each of the rolls but is contemplated as being included at least on the drive rolls 30L, 30aU, 31L, and 31aU.

Figure 9:
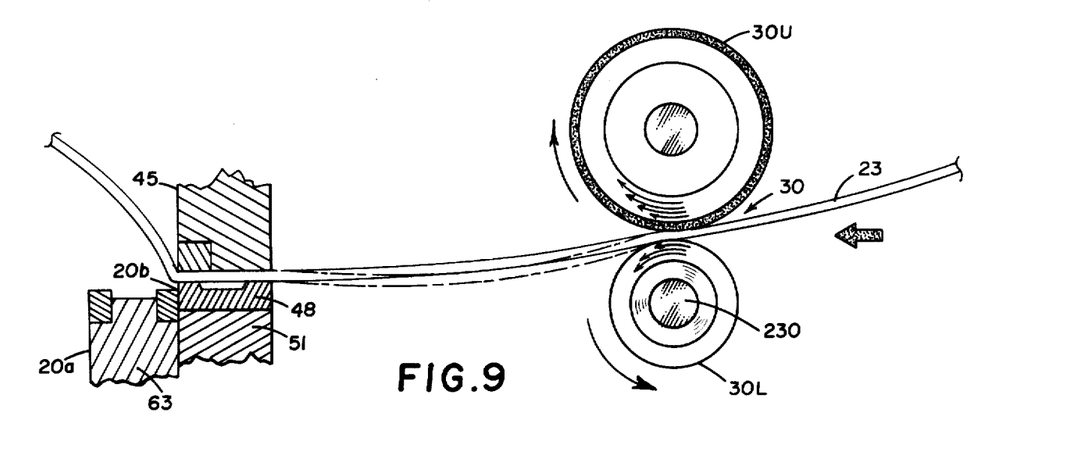
FIG. 9 is a detailed view of the end feed one set of feed rolls, showing the action of the rolls when the lead end of the strip is clamped and a cut is being performed.

In operation, when the lead end of the strip is stopped by the associated clamp mechanism or by the knife piercing the material if a clamp is not used, the inherent bow or arc of the lead portion of the strip will flex a slight bit further (such as to the dotted line portion shown in FIG. 9). Additionally, the resilient surface of the rolls permits the axis or internal body portions of the rolls to continue rotating at its constant velocity. However, the exterior surface of the roll is, in effect, stopped while the rubber layer resiliently deforms a slight amount. This is illustrated in FIG. 9 by the arrows associated with the rolls which represent in diagrammatic form the speeds of the exterior surface of the rolls. After the lead end of the strip is released, the inherent resiliency of the rubber layer plus the arcuate bow of the strip impart an acceleration to the strip to rapidly move it forward the incremental distance required. In this manner, although the rolls themselves are driven at a constant velocity, the lead end of the strip undergoes an intermittent movement. The thickness and resiliency of the outer layer of the roll will, of course, ideally be a variable depending upon the required distance between successive cuts as well as the speed at which the movable blade is reciprocated. Additionally, the most ideal arcuate relationship will depend upon the same variables as well as the inherent stiffness of the strip material.

One of the important aspects of the subject machine is that the eccentric connecting rod motion is used to shift the knives endwise, i.e., provide the longitudinal motion. This has the advantage of being a much simpler and quieter mechanism compared to a cam mechanism which was previously used in this general type of machine. Additionally, there are substantially fewer problems involved in mass balancing a drive system of this type.

The end motion is derived from the previously described shaft 118 which, in the subject embodiment, rotates at one-half the speed of the main shaft 78. It is apparent that an exact phase relationship is necessary between these two shafts. Provision is made for adjusting this relationship within one-half degree of main shaft rotation, and it was originally assumed that maximum excursion endwise of the knife would correspond to the midpoint of its vertical travel. The resulting knife motion of this phase relationship is shown in FIG. 11.

Figure 11:
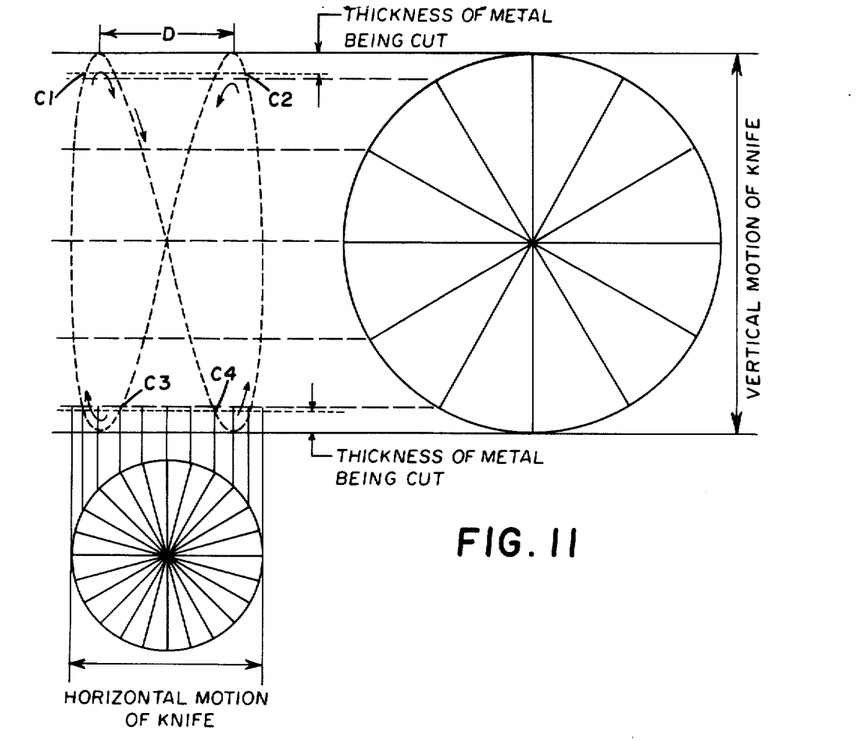
FIG. 11 is a diagram illustrating the motion of a point on the blade when the eccentrics are positioned such that the maximum endwise movement of the knife corresponds to the midpoint of its vertical travel.

The dotted line of FIG. 11 shows the pattern followed by any point on the moving knife, and can therefore be considered as a point at either the top or bottom cutting edges. The distance shown as D is the horizontal travel between the same point on two successive strokes when the knife is at maximum and minimum vertical positions. This is the required longitudinal reciprocation distance which would commonly be called "shuttle travel" and in FIG. 11 is one-half the distance between adjacent teeth on the knife. If the knife moved straight up and down while piercing the metal, D is the distance it would reciprocate longitudinally between successive strokes.

On the subject drive, however, the cutting edges move in the direction of the arrows and along a path shown by the dash line trace and, although a point on the cutting edge of a tooth achieves the required half-tooth spacing (distance D), on successive strokes and at the horizontal limits of its travel, that point follows a curved path and cuts through the metal at a location which is laterally spaced with respect to the point at the horizontal travel limit. Considering a point on an upper cutting tooth of a movable blade, that tooth cuts through the metal at a point $C_1$ and then, on the successive cut, cuts through the metal at a point $C_2$. It may be noted that the distance between the points $C_1$ and $C_2$ exceeds the desired half-tooth spacing, and material made by teeth on the upper edge has a characteristic pattern obtained when shuttle travel is too great. Considering a point on a lower cutting tooth of that same movable blade, that tooth cuts through the metal at a point $C_3$ and then, on the successive cut, cuts through the metal at a point $C_4$. It may be noted that the distance between the points $C_3$ and $C_4$ is less than the desired half-tooth spacing, and material made by teeth on the lower edge has a characteristic pattern obtained when shuttle travel is too short.

Figure 10:
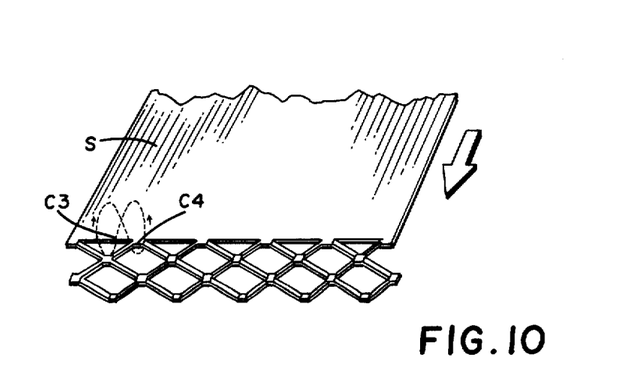
FIG. 10 is a perspective view of a partially expanded sheet of strip stock, showing the strip in a condition attained after three successive cuts and showing the path of travel of a cutting tooth.
Figure 12:
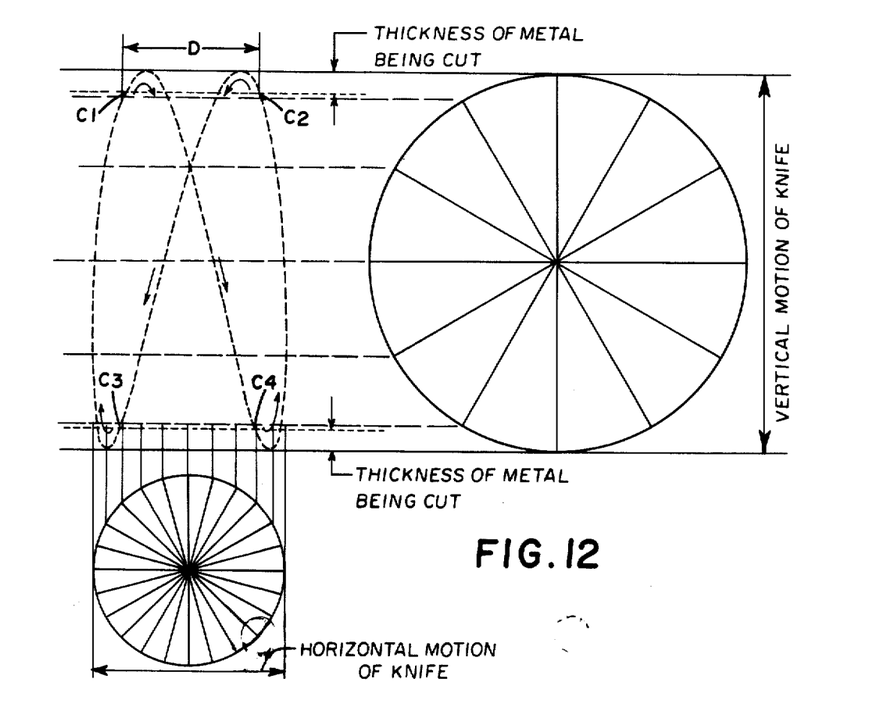
FIG. 12 is a diagram similar to FIG. 11, with the main shaft eccentrics retarded 30° relative to the setting illustrated in FIG. 10.

In an attempt to overcome the above problem, it was determined that if a phase angle is introduced between the two shafts 118 and 78, a distorted path results, as shown in FIG. 12. Here the main shaft 78 was retarded 30 degrees over its previous relationship, and the resulting path trace developed. Note that the points of initial contact $C_1$ and $C_2$ at the top of the diagram are pulled in much closer together and the points of initial contact at the bottom $C_3$ and $C_4$ are separated. In the diagram, the distance between these points is in both cases substantially identical, and is in substantial alignment with the half-tooth spacing D. This pattern is shown in FIG. 10, where a point on a lower tooth has engaged a strip S at point $C_3$ to form the illustrated half-diamond pattern and (after forward indexing of the strip S) is about to engage the strip S at point $C_4$ to complete the diamond. It is apparent that by choosing the proper phase angle, these "effective" shuttle travel distances can be adjusted within as close limits as desirable. A phase angle of 18 degrees with the main shaft lagging balanced out the patterns almost perfectly for knives having a pattern known as 2/0 in the industry. The required phase angle relationship must, of course, vary with knife pattern variations.

The required phase shift can be obtained in either of two ways. First, it can be accomplished by changing the angular relationship at the point where the main shaft is geared to the vertical drive shaft of the shuttle eccentrics. This applies the same phase shift to both top and bottom eccentrics. In certain instances where the patterns are different on the upper and lower knives, a separate phase shift may be required for each knife. Thus, when it is desirable to make one pattern on the upper knife and another on the lower knife of the same machine, a different method of phase shift will be required.

A second method which would permit separate phase shift for each knife can be carried out on the machine. Since each knife pattern has its own shuttle eccentric, when a knife of a different pattern is installed, the appropriate eccentric can also be installed. These eccentrics can, therefore, have their keyways displaced from the normal position by the appropriate angle to compensate for their particular pattern. This is believed to be the more desirable method, since the main gearing never has to be changed.

Figure 13:
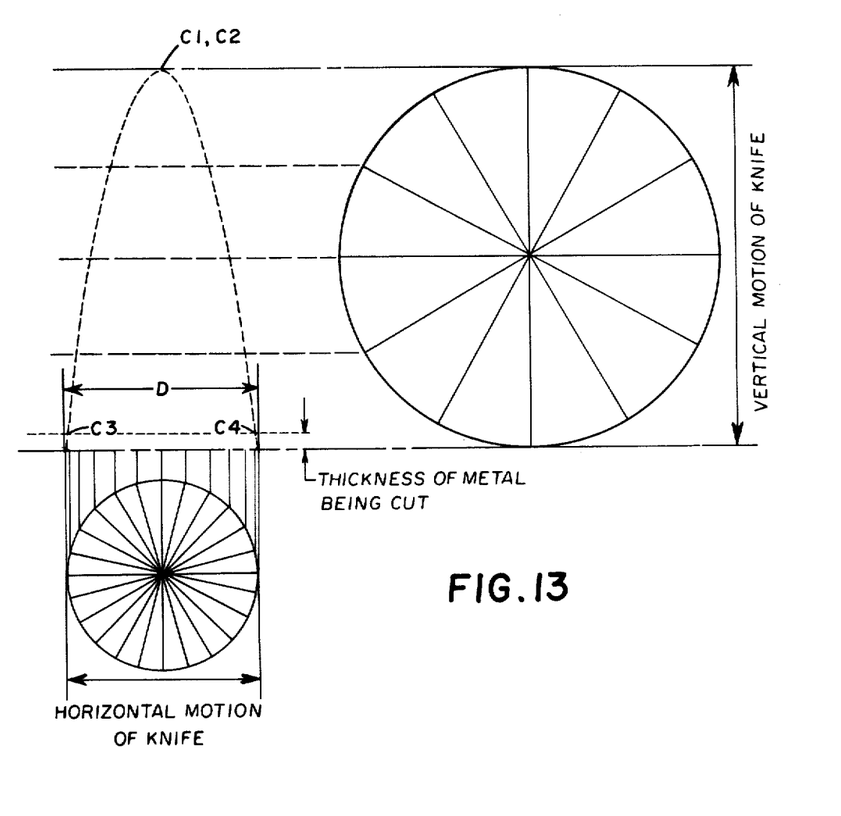
FIG. 13 is a diagram similar to FIG. 11 and FIG. 12, but showing the trace development of a 90° phase shift.

FIG. 13 shows a trace developed with a 90° phase shift and with the shaft 78 lagging. The two points $C_1$ and $C_2$ at the top have drawn together, and the two points $C_3$ and $C_4$ at the bottom are fully separated. In this one instance, the maximum endwise excursion of the blade corresponds to the precise one-half tooth spacing D. This is not proper for the machine when both edges of the blades are performing a cutting operation, but ideal for a machine whose knives cut on only one edge, i.e., at points $C_3$ and $C_4$.

While there have been described what are at present considered to be the preferred embodiments and aspects of this invention, it will be obvious to those skilled in the art that various changes and modifications may be made therein without departing from the invention, and it is intended therefore in the appended claims to cover all such changes and modifications as fall within the true spirit and scope of the invention.

What is claimed is:

1. Apparatus for manufacturing expanded sheet stock comprising:

a. first and second knife means for shearing openings in flat sheet stock, said first knife means comprising an elongated bar having a first face defined by a plurality of teeth and having a flat intersecting second face, portions of an intersection between said first and second faces defining a cutting edge for said first knife means, said second knife means comprising a first guide surface for said sheet stock and a second guide surface for said second face, an intersection between said first and second surfaces defining a cutting edge for said second knife means;

b. means for mounting said second face and said second guide surface in substantial planar alignment;

c. means defining third and fourth guide surfaces, said third guide surface being spaced from said first guide surface to also comprise a guide surface for said sheet stock, said fourth guide surface being in substantially planar alignment with said second guide surface and being in face-to-face contact with said second face;

d. means for feeding said strip between said first and third guide surfaces and between said cutting edges; and e. drive means for moving said first knife relative to said second knife in planar alignment therewith and in essentially simple harmonic motion recurringly along a curvilinear path to permit a rapid knife movement and reduce vibration in the apparatus and while said strip is fed therebetween so that any point on the cutting edge of a tooth sequentially shears said strip in a recurring sequence of point (1), to point (2), to point (*n*), where even-numbered points are spaced along a first line along the length of the strip, where the odd-numbered points are spaced on a second parallel line and are staggered with respect to said even-numbered points, and where said lines are spaced apart a distance substantially corresponding to one-half the distance between identically located points on adjacent teeth.

2. Apparatus according to claim 1, wherein said elongated bar has a flat third face intersecting said first face and including bridge means having a flat face in contact with said third face.

3. Apparatus according to claim 1, wherein said teeth have an obelisk configuration.

4. Apparatus according to claim 1, wherein said first knife means comprises a pair of said elongated bars, each having at least one cutting edge and wherein a second knife means is provided for each cutting edge provided on said elongated bars.

5. Apparatus according to claim 4, wherein said drive means moves said knife means toward and away from each other.

6. Apparatus according to claim 4, wherein said elongated bars each have two cutting edges extending generally parallel and wherein there are four of said second knife means each positioned to cooperate with a separate one of said cutting edges.

7. Apparatus according to claim 1, wherein said drive means includes first eccentric means drivingly connected to said first knife means for moving said first knife means in directions normal to said cutting edge.

8. Apparatus according to claim 7, wherein said drive means includes second eccentric means drivingly connected to said first knife means for moving said first knife means back and forth in directions parallel to said cutting edge.

9. Apparatus according to claim 8, wherein said drive means drives said first eccentric means through two revolutions as it drives said second eccentric means through a single revolution.

10. Apparatus according to claim 9, wherein said first eccentric lags behind and is out of phase with said second eccentric with respect to an in-phase relationship wherein said second eccentric positions said first knife means at a position corresponding to its maximum endwise excursion and said first eccentric positions said first knife means at the midpoint of its travel normal to said cutting edge.

11. Apparatus according to claim 10, wherein said eccentrics are 90° out of phase.

* * * * *